(12) United States Patent
Shim et al.

(10) Patent No.: US 10,613,589 B2
(45) Date of Patent: Apr. 7, 2020

(54) ELECTRONIC DEVICE

(71) Applicant: LG ELECTRONICS INC., Seoul (KR)

(72) Inventors: Hongjo Shim, Seoul (KR); Hyunwoo Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 60 days.

(21) Appl. No.: 15/831,002

(22) Filed: Dec. 4, 2017

(65) Prior Publication Data

US 2018/0364763 A1 Dec. 20, 2018

(30) Foreign Application Priority Data

Jun. 20, 2017 (KR) .................. 10-2017-0078031

(51) Int. Cl.
| | |
|---|---|
| *G06F 1/16* | (2006.01) |
| *G06F 3/0487* | (2013.01) |
| *H04M 1/02* | (2006.01) |
| *G06F 3/0488* | (2013.01) |
| *H04M 1/23* | (2006.01) |

(52) U.S. Cl.
CPC .......... *G06F 1/1656* (2013.01); *G06F 1/1626* (2013.01); *G06F 1/1684* (2013.01); *G06F 3/0487* (2013.01); *G06F 3/04886* (2013.01); *H04M 1/0249* (2013.01); *H04M 1/236* (2013.01); *H04M 2250/12* (2013.01)

(58) Field of Classification Search
None
See application file for complete search history.

(56) References Cited

U.S. PATENT DOCUMENTS

| | | | |
|---|---|---|---|
| 2010/0079395 A1* | 4/2010 | Kim ...................... | G06F 1/1626 345/173 |
| 2010/0151916 A1* | 6/2010 | Baek .................. | H04M 1/72519 455/567 |
| 2016/0062391 A1* | 3/2016 | Choi ................... | H04M 1/0266 361/679.03 |
| 2017/0154742 A1* | 6/2017 | Hisano .................... | G06F 3/044 |

* cited by examiner

*Primary Examiner* — Christopher R Lamb
(74) *Attorney, Agent, or Firm* — Birch, Stewart, Kolasch & Birch, LLP

(57) ABSTRACT

An electronic device includes a body including a case formed of a metallic material and forming side surfaces; a display unit coupled to the case, and forming a front surface of the body; a grip sensor attached to one region of the case, and configured to sense a pressure applied to the side surfaces; and a controller configured to execute a specific function by the grip sensor, wherein the case forms a mounting space for accommodating the grip sensor therein, and wherein the case includes a transformation portion formed in a thickness direction of the case, at a region near the grip sensor.

13 Claims, 19 Drawing Sheets

ELECTRONIC DEVICE

CROSS-REFERENCE TO RELATED APPLICATION

Pursuant to 35 U.S.C. § 119(a), this application claims the benefit of an earlier filing date of and the right of priority to Korean Application No. 10-2017-0078031, filed on Jun. 20, 2017, the contents of which are incorporated by reference herein in its entirety.

BACKGROUND OF THE INVENTION

1. Field of the Invention

This specification relates to an electronic device including a grip sensor.

2. Background of the Invention

Electronic devices may be generally classified as mobile/portable electronic devices or stationary electronic devices according to their mobility. Electronic devices may also be classified as handheld electronic devices or vehicle mounted electronic devices according to whether or not a user can directly carry the electronic device.

Electronic devices have become increasingly more functional. Examples of such functions include data and voice communications, capturing images and video via a camera, recording audio, playing music files via a speaker system, and displaying images and video on a display. Some electronic devices include additional functionality which supports game playing, while other electronic devices are configured as multimedia players. More recently, electronic devices have been configured to receive broadcast and multicast signals which permit viewing of content such as videos and television programs. Efforts are ongoing to support and increase the functionality of electronic devices. Such efforts include software and hardware improvements, as well as changes and improvements in the structural components.

Recently, a grip sensor is mounted to a side surface of a body of the electronic device, for a simplified design of the appearance of the electronic device and for control of various functions. The grip sensor senses a pressure applied when a user holds an electronic device. The electronic device may determine whether it is held by a user based on a pressure, or may execute a specific function by a pressure. Recently, the grip sensor which senses consecutive touch inputs may control functions according to the consecutive touch inputs. As functions according to touch inputs sensed by the grip sensor become various, the grip sensor should sense a touch input and a pressure more precisely.

In case of forming a case which forms the appearance of the electronic device with a metallic material, the metallic case is not easily transformed. Accordingly, the metallic case has a smaller transformation degree than other cases formed of other materials when a pressure is applied thereto. Thus, the grip sensor disposed in the case may not sense a micro pressure, thereby having a lowered sensitivity.

SUMMARY OF THE INVENTION

Therefore, an aspect of the detailed description is to provide an electronic device including a case structure to more effectively transfer a pressure to a grip sensor disposed in a case.

To achieve these and other advantages and in accordance with the purpose of this specification, as embodied and broadly described herein, there is provided an electronic device, comprising: a body including a case formed of a metallic material and forming side surfaces; a display unit coupled to the case, and forming a front surface of the body; a grip sensor attached to one region of the case, and configured to sense a pressure applied to the side surfaces; and a controller configured to execute a specific function by the grip sensor, wherein the case forms a mounting space for accommodating the grip sensor therein, and wherein the case includes a transformation portion formed in a thickness direction of the case, at a region near the grip sensor.

In an embodiment, the case includes an outer surface which forms an appearance of the body, and an inner surface where the grip sensor is arranged. And the transformation portion is formed between the outer surface and the inner surface.

In an embodiment, the transformation portion is formed as a groove recessed from one surface which connects the outer surface and the inner surface to each other.

In an embodiment, the transformation portion is arranged near the grip sensor, and is formed of a plastic material.

In an embodiment, the case includes a first assembly member which forms an appearance of the case, and a second assembly member including the mounting space for accommodating the grip sensor therein. And the transformation portion is disposed on the second assembly member.

In an embodiment, the case includes a recess region. And the grip sensor is attached to the transformation portion, and the transformation portion is mounted to the recess region.

In an embodiment, the transformation portion includes a first region disposed in a thickness direction of the case, and a second region for supporting the grip sensor.

In an embodiment, the mounting space is formed between the outer surface and the inner surface.

In an embodiment, the case further includes a supporting frame disposed in the body and configured to support at least one electronic device. And the transformation portion is configured as a hole formed at one region of the supporting frame adjacent to the grip sensor.

In an embodiment, the display unit and the rear cover are attached to different regions of the case by a waterproof adhesive member.

In an embodiment, the case includes: a first case member having an opening; and a second case member partially exposed to the outside through the opening, and mounted to the first case member by an adhesive member. The grip sensor is fixed to the second case member. And a specific gap is formed between the first and second case members.

In an embodiment, the second case member includes fixed regions extended from both ends of the second case member, and adhesive members are attached to the fixed regions.

In an embodiment, the case includes an extended portion for supporting the display unit, and the transformation portion is configured as a hole formed at the extended portion.

In an embodiment, the case includes at least one stepped portion protruded from an inner surface of the case to which the grip sensor has been attached.

In the present invention, the transformation portion is formed as a groove or a hole such that the case which forms side surfaces of the electronic device has its thickness reduced partially, or the transformation portion is formed of a plastic material having a low intensity. This may allow an external force to be effectively applied to the grip sensor due to the low intensity.

Thus, the grip sensor, mounted to the case of the electronic device and formed of a metallic material, may have an enhanced quality.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Electronic devices presented herein may be implemented using a variety of different types of electronic devices. Examples of such electronic devices include cellular phones, smart phones, user equipment, laptop computers, digital broadcast electronic devices, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of electronic devices. However, such teachings apply equally to other types of electronic devices, such as those types noted above. In addition, these teachings may also be applied to stationary electronic devices such as digital TV, desktop computers, and a digital signage.

Figure 1A:
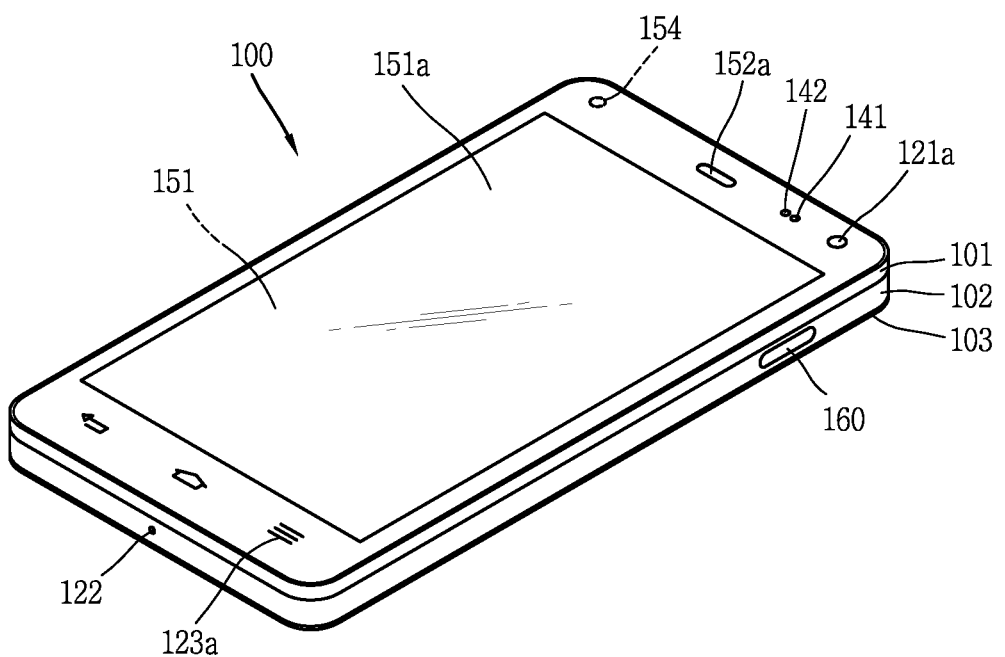
FIGS. 1A and 1B are conceptual views illustrating an example of an electronic device according to the present invention, which are viewed from different directions.
Figure 1B:
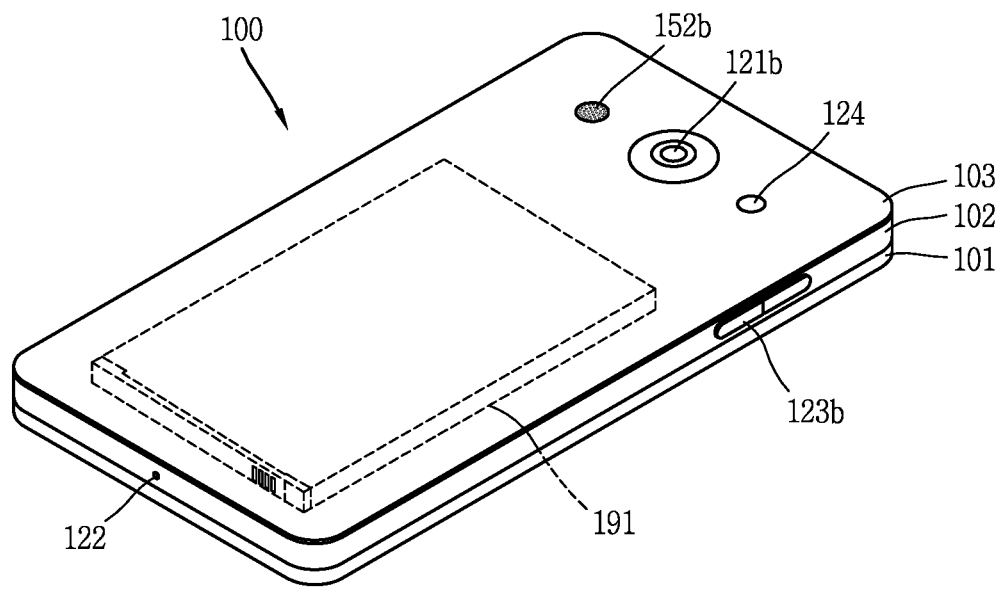

FIGS. 1A and 1B are conceptual views illustrating an example of an electronic device according to the present invention, which are viewed from different directions.

Referring now to FIGS. 1A and 1B, the electronic device 100 is described with reference to a bar-type device body. However, the electronic device 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of electronic device (for example, bar-type, watch-type, glasses-type, and the like). However, such teachings with regard to a particular type of electronic device will generally apply to other types of electronic devices as well.

The electronic device 100 will generally include a case (for example, frame, housing, cover, and the like) forming the appearance of the electronic device. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the device body to output information. As illustrated, a window 151a of the display unit 151 may be mounted to the front case 101 to form the front surface of the device body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the electronic device 100 may be configured such that one case forms the inner space. In this example, an electronic device 100 having a uni-body is formed in such a manner that synthetic resin or metal extends from a side surface to a rear surface.

If desired, the electronic device 100 may include a waterproofing unit (not shown) for preventing introduction of water into the device body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1A and 1B depict certain components as arranged on the electronic device. However, it is to be understood that alternative arrangements are possible and within the teachings of the instant disclosure. Some components may be omitted or rearranged. For example, the first manipulation unit 123a may be located on another surface of the device body, and the second audio output module 152b may be located on the side surface of the device body.

The display unit 151 is generally configured to output information processed in the electronic device 100. For example, the display unit 151 may display execution screen information of an application program executing at the electronic device 100 or user interface (UI) and graphic user interface (GUI) information in response to the execution screen information.

The display unit 151 outputs information processed in the electronic device 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as a user input unit. Therefore, the touch screen may replace at least some of the functions of the first manipulation unit 123a. Hereinafter, for convenience, the display unit (display module) for outputting an image and the touch sensor will be referred to as the touch screen 151.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the electronic device 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIGS. 1A and 1B illustrate the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the device body. The rear input unit can be manipulated by a user to provide input to the electronic device 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the device body. As one example, the rear input unit may be located on an upper end portion of the rear side of the device body such that a user can easily manipulate it using a forefinger when the user grabs the device body with one hand. Alternatively, the rear input unit can be positioned at most any location of the rear side of the device body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the electronic device 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the electronic device 100, but other locations are possible. If desired, multiple microphones may be implemented, with such an arrangement permitting the receiving of stereo sounds.

The interface unit 160 may serve as a path allowing the electronic device 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121b is shown located at the rear side of the device body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the device body. The second audio output module 152b may implement stereophonic sound functions in conjunction with the first audio output module 152a, and may be also used for implementing a speaker phone mode for call communication.

At least one antenna for wireless communication may be located on the device body. The antenna may be installed in the device body or formed by the case. For example, an antenna which configures a part of the broadcast receiving module 111 may be retractable into the device body. Alternatively, an antenna may be formed using a film attached to an inner surface of the rear cover 103, or a case that includes a conductive material.

A power supply unit 190 for supplying power to the electronic device 100 (refer to FIG. 1A) may include a battery 191, which is mounted in the device body or detachably coupled to an outside of the device body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the device body, the rear case 103 may be detachably coupled to the rear case 102.

An accessory for protecting an appearance or assisting or extending the functions of the electronic device 100 can also be provided on the electronic device 100. As one example of an accessory, a cover or pouch for covering or accommodating at least one surface of the electronic device 100 may be provided. The cover or pouch may cooperate with the display unit 151 to extend the function of the electronic device 100. Another example of the accessory is a touch pen for assisting or extending a touch input to a touch screen.

Figure 2A:
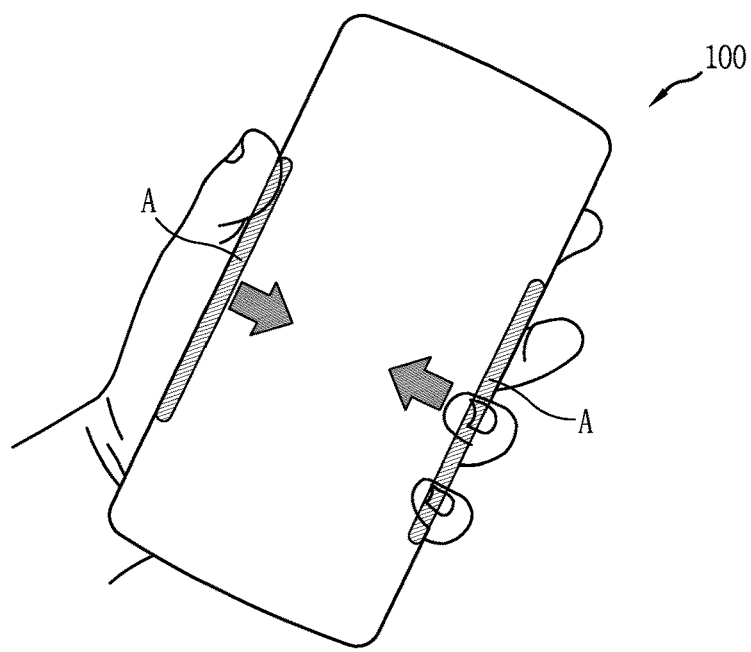
FIGS. 2A and 2B are conceptual views for explaining a grip sensor mounted to the electronic device.
Figure 2B:
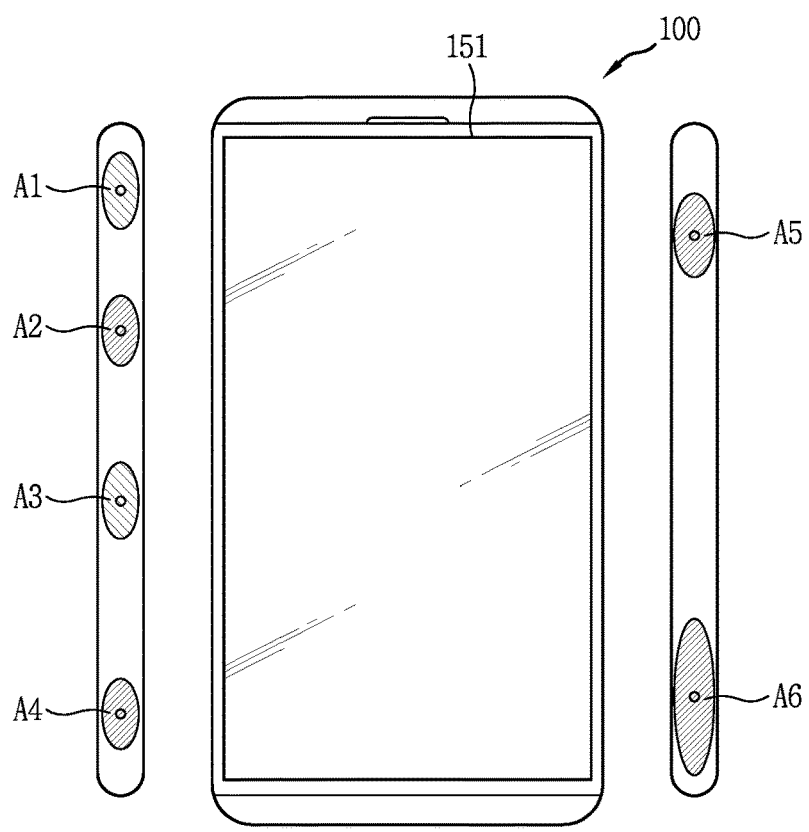

FIGS. 2A and 2B are conceptual views for explaining a grip sensor mounted to the electronic device.

The grip sensor according to an embodiment of the present invention may be disposed on a side surface of the body of the electronic device. The grip sensor may be disposed at each of a plurality of regions (A1, A2, A3, A4, A5, A6) on side surfaces of the body, and a plurality of grip sensors may be disposed at the plurality of regions (A).

Each of the grip sensors senses a pressure applied to at least one of the plurality of regions, and the controller 180 executes a function corresponding to each of the regions based on a pressure sensed by each of the grip sensors. Areas sensed by the grip sensors may be set to be different from each other, and a distance between the grip sensors may not be constant.

Figure 2C:
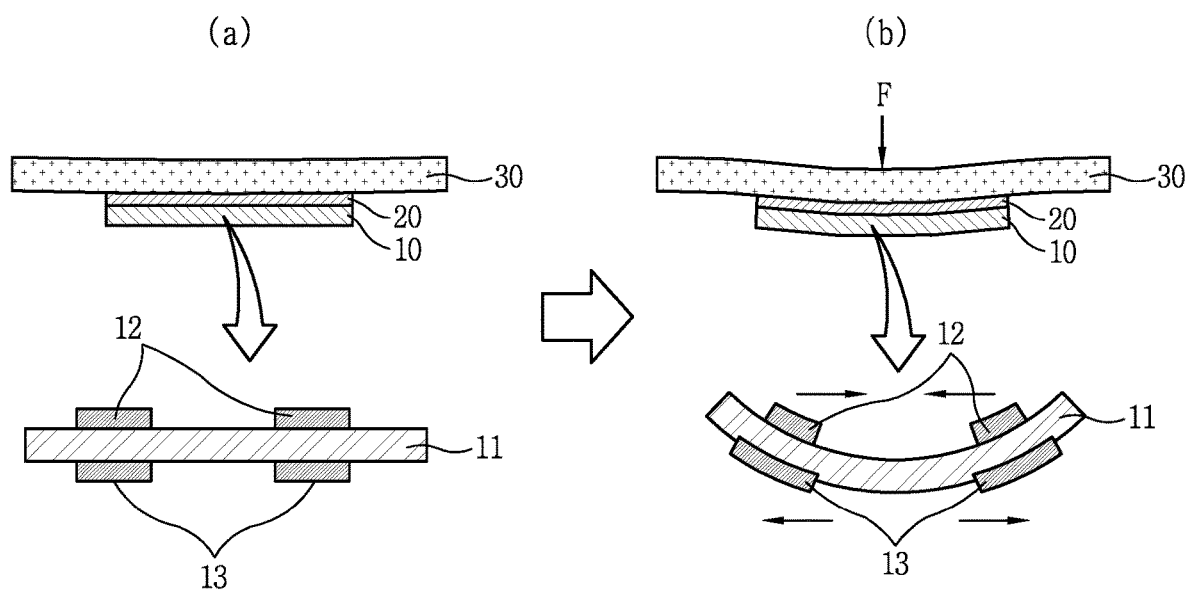
FIG. 2C is a conceptual view showing a grip sensor attached to a substrate.

FIG. 2C is a conceptual view showing the grip sensor attached to a substrate.

The substrate 30 may correspond to the front case 101 (refer to FIGS. 1A and 1B) which forms the appearance of the electronic device according to the present invention, and which forms an inner space. The grip sensor 10 is fixed onto the substrate 30 by an adhesive member 20. The grip sensor 10 includes a base substrate 11, and first and second transformation members 12, 13 formed on both surfaces of the base substrate 11. When each of the first and second transformation members 12, 13 is formed in plurality in number, the first transformation members 12 may be spaced apart from each other and the second transformation members 13 may be spaced apart from each other, on the base substrate 11.

If a pressure (F) is applied onto the substrate 30 where the grip sensor 10 is attached, the substrate 30 is transformed. Once the substrate 30 is transformed in a direction that the pressure (F) is applied, the base substrate 11 is also bent in the same direction. The first and second transformation members 12, 13 formed on both surfaces of the base substrate 11 are transformed in opposite directions. More specifically, the first transformation members 12 disposed on a concaved surface of the base substrate 11 are contracted, whereas the second transformation members 13 disposed on a convex surface of the base substrate 11 are expanded. Accordingly, the first transformation members 12 have their resistance value lowered due to the contraction, whereas the second transformation members 13 have their resistance value increased due to the expansion. As output values are changed due to the change of the resistance values of the first and second transformation members 12, 13, the controller 180 may acquire information indicating whether a pressure has been applied to the electronic device, and information indicating a degree and a direction of the applied pressure.

The electronic device 100 according to the present invention includes the grip sensor 10 disposed at one region of side surfaces of the front case 101. The grip sensor 10 is attached to an inner surface of the front case 101, and one region of the front case 101 is transformed by being pressed. When one region of the front case 101 is pressed, the grip sensor 10 may be transformed and may sense that a pressure has been applied through a change of a resistance value of the transformation members.

The front case which forms the side surfaces of the electronic device 100 according to the present invention may be formed of a metallic material. The grip sensor 10 is disposed in the front case which forms the side surfaces. The electronic device 100 according to the present invention includes the front case having a transformed structure such that an external force may be smoothly transferred to the grip sensor 10.

Hereinafter, a structural characteristic of the front case according to various embodiments will be explained.

Figure 3A:
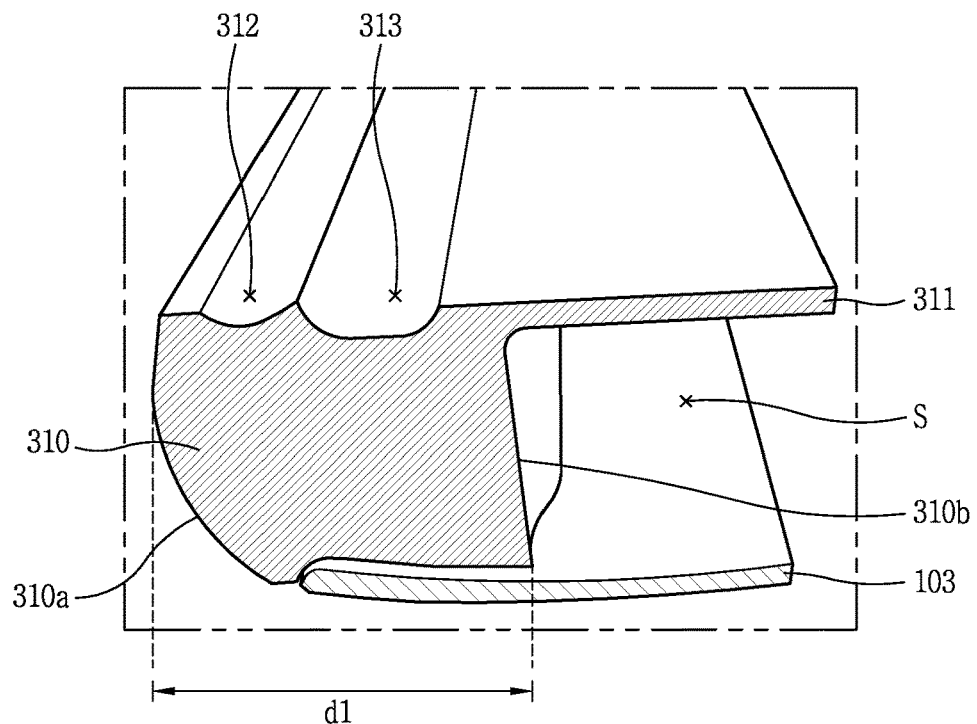
FIGS. 3A and 3B are views for explaining a front case having its thickness at one region reduced, according to first and second embodiments of the present invention.
Figure 3B:
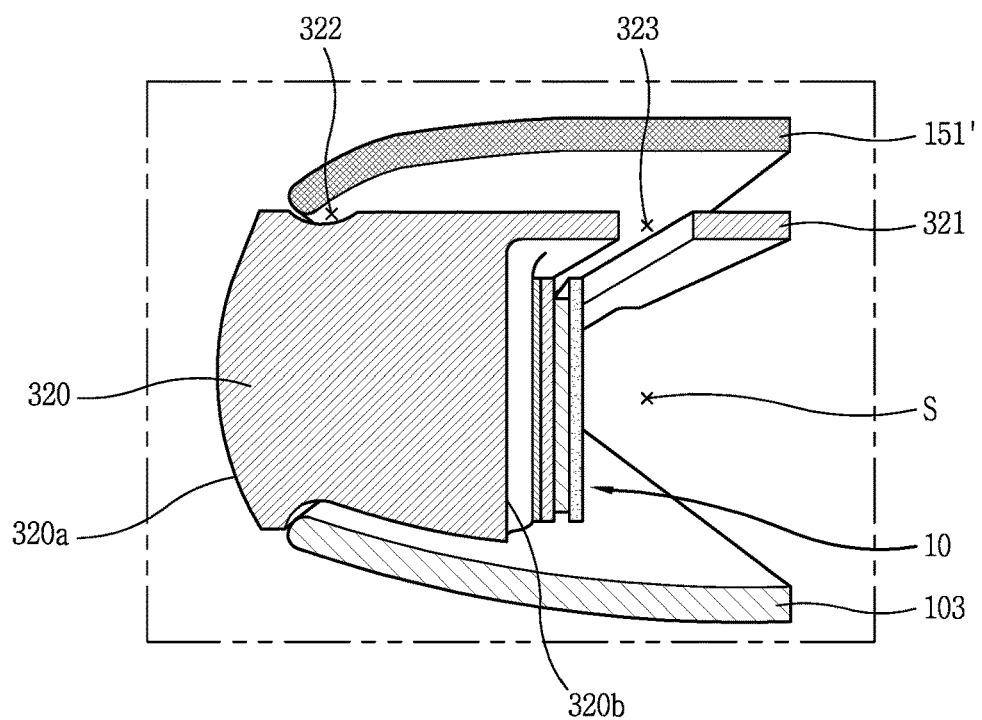

FIGS. 3A and 3B are views for explaining a front case having its thickness at one region reduced, according to first and second embodiments of the present invention.

The first case 310 shown in FIG. 3A has a first thickness (d1) from an outer surface 310a to an inner surface 310b which forms an inner space of the electronic device 100. The first case 310 includes an extended portion 311 extended from one region and configured to support the display unit 151 (refer to FIG. 1A). The rear cover 103 is mounted to one region of the first case 310 where the extended portion 311 is not extended.

A mounting space (S) where the grip sensor 10 is arranged is formed among a lower surface of the extended portion 311, the inner surface 310b and the rear cover 103. The grip sensor 10 may be attached to the inner surface 310b. The grip sensor 10 is attached to the inner surface 310b by an adhesive member, etc.

Although not shown, an inner frame and/or other electronic components are arranged at the space where the grip sensor 10 is disposed. Accordingly, the grip sensor 10 may be supported by the inner frame and/or other electronic components. If an external force is applied to the outer surface 310a of the first case 310, a part of the grip sensor is transformed and thus an output value is changed.

A guide groove 312 for mounting an edge of the display unit 151 is formed at one surface where the extended portion 311 of the first case 310 is extended, and a transformation portion 313 is formed near the guide groove 312. The transformation portion 313 is formed as a groove recessed from an outer surface of the first case 310. The transformation portion 313 is inward formed from the outer surface such that the thickness at one region of the front case 310 is reduced, and is extended in an extension direction of the first case 310. The transformation portion 313 is formed at a region adjacent to one region where the grip sensor 10 is arranged. A depth of the transformation portion 313 may be formed to be substantially equal to or smaller than a thickness of the extended portion 311.

Since the transformation portion 313 formed as a groove reduces a thickness of one region of the first case, an intensity of the first case 310 formed of a metallic material may be reduced. Even if the first thickness (d1) of the first case 310 is not reduced, the first case 310 is easily transformed by the transformation portion 313 when an external force is applied thereto. Thus, an external force applied to the first case 310 can be transferred to the grip sensor 10 more effectively.

A second case 320 shown in FIG. 3B includes an extended portion 321, and a guide groove 322 for supporting an edge of a window 151'. The rear cover 103 is mounted to an opposite region to one region of the second case 320 where the window 151' is arranged.

The second case 320 is composed of an outer surface 320a which forms an outer surface of the electronic device 100, and an inner surface 320b which forms an inner space. And the second case 320 may be formed of a metallic material.

The grip sensor 10 may be attached to the inner surface 320b. That is, the grip sensor 10 is disposed at a mounting space (S) formed by the extended portion 321 and the inner surface 320b.

The second case 320 includes a transformation portion 323 formed at the extended portion 321, and the transformation portion 323 may be formed as at least one hole extended in one direction. The hole is formed to be communicated with the mounting space (S). The transformation portion 323 may be formed to correspond to the grip sensor 10.

An intensity of the second case 320 is reduced by the transformation portion 323, and a transformation and a movement of one region of the second case 320 may be facilitated by an external force applied to the outer surface 320a. Thus, the external force may be transferred to the grip sensor 10 more smoothly.

Figure 3C:
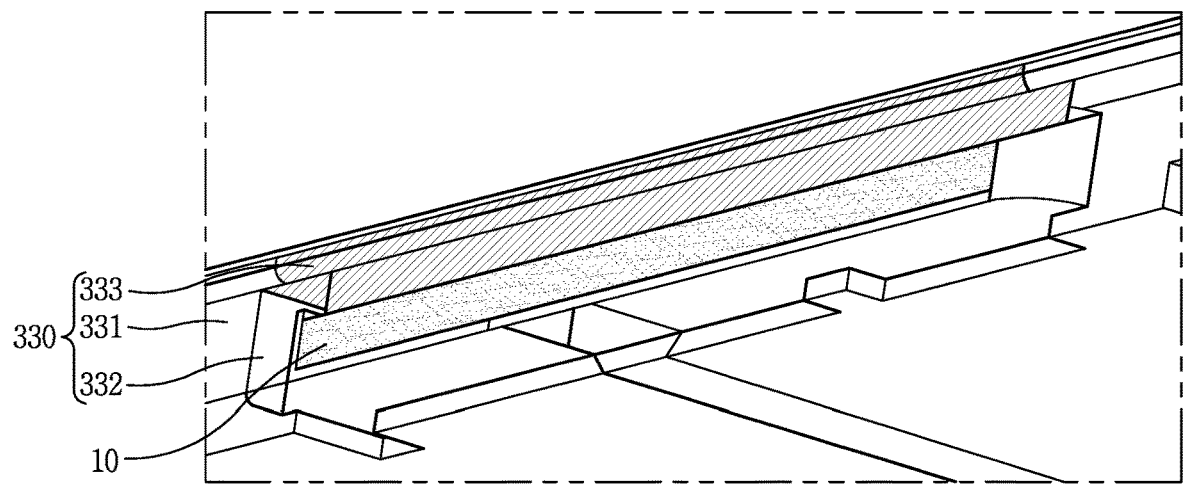
FIG. 3C is a view for explaining a third case according to another embodiment.

FIG. 3C is a view for explaining a third case according to another embodiment.

The third case 330 includes a first assembly member 331 formed of a metallic material, a second assembly member 332 for accommodating the grip sensor 10 therein, and a transformation portion 333 formed of a plastic material.

The first assembly member 331 may form an outer surface of the electronic device, and may be extended to a frame which supports an inner space of the electronic device. The second assembly member 332 includes an accommodation space for accommodating the grip sensor 10 therein. The second assembly member 332 may be integrally formed with the first assembly member 331. The grip sensor 10 is accommodated in the second assembly member 332, and the second assembly member 332 protrudes from an inner surface of the first assembly member 331 in order to form an accommodation space.

The transformation portion 333 is formed of a plastic material different from a metallic material. The transformation portion 333 is disposed on the second assembly member 332. A thickness of the transformation portion 333 is substantially equal to that of the second assembly member 332.

That is, a thickness of the third case 330 is the sum of the thickness of the second assembly member 332 and the transformation portion 333 and a thickness of the first assembly member 331.

An intensity of the transformation portion 333 is lower than that of the first and second assembly members 331, 332 formed of a metallic material. Since the third case is well transformed by an external force, an intensity of one region of the third case 330 where the grip sensor 10 is arranged is reduced. Thus, an external force applied to the third case 330 can be transferred to the grip sensor 10 more effectively.

Figure 3D:
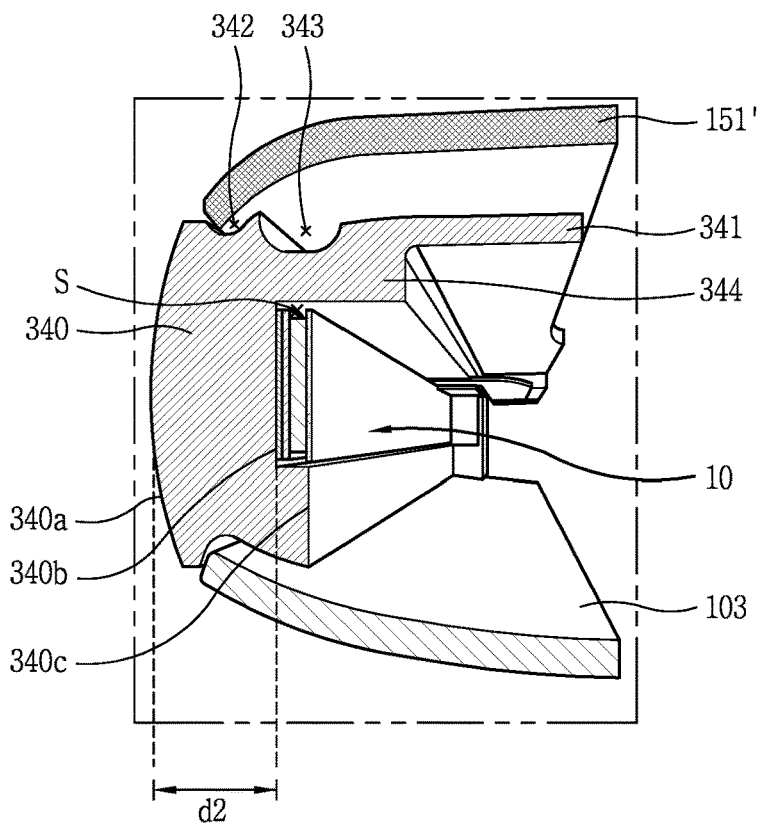
FIG. 3D is a conceptual view for explaining a structure of a fourth case.

FIG. 3D is a conceptual view for explaining a structure of a fourth case.

The fourth case 340 of FIG. 3D includes a mounting space (S) recessed from an inner surface 340c of the fourth case 340. The grip sensor 10 may be arranged at the mounting space (S) so as to form one surface with the inner surface 340c. That is, a recessed width of the mounting space (S) may be substantially equal to a thickness of the grip sensor 10. The fourth case 340 has an inner surface 340b recessed, and the grip sensor 10 is attached to the inner surface 340b.

A transformation portion 344 is provided with a stepped portion formed at an extended portion 341 extended from one region of the fourth case 340 and configured to support the display unit 151, etc. A thickness of the transformation portion 344 is formed to be larger than a second thickness (d2) of the fourth case 340.

The rear cover 103 is formed at an opposite region to one region of the fourth case 340 where the extended portion 341 is formed.

In this embodiment, the fourth case 340 has its relatively thick region maintained by the stepped portion, thereby maintaining its durability. Further, since a distance between an outer surface 340a of the fourth case 340 and the grip sensor 10 is minimized, an external force applied to the fourth case 340 can be transferred to the grip sensor 10 more effectively.

Figure 4A:
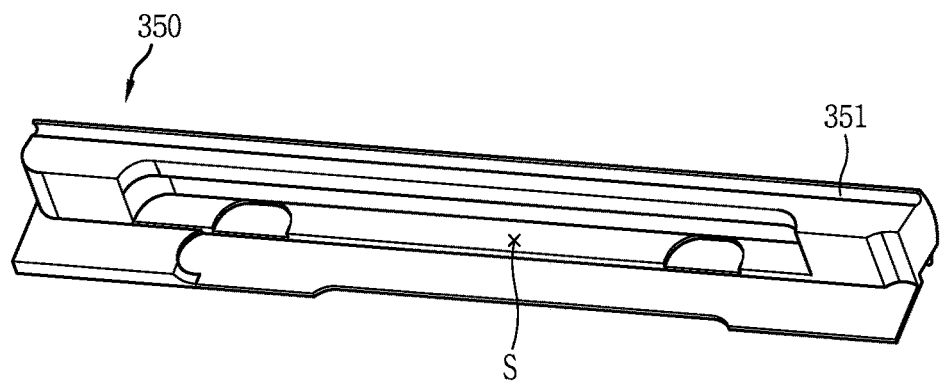
FIGS. 4A and 4B are conceptual views for explaining a structure of a fifth case.
Figure 4B:
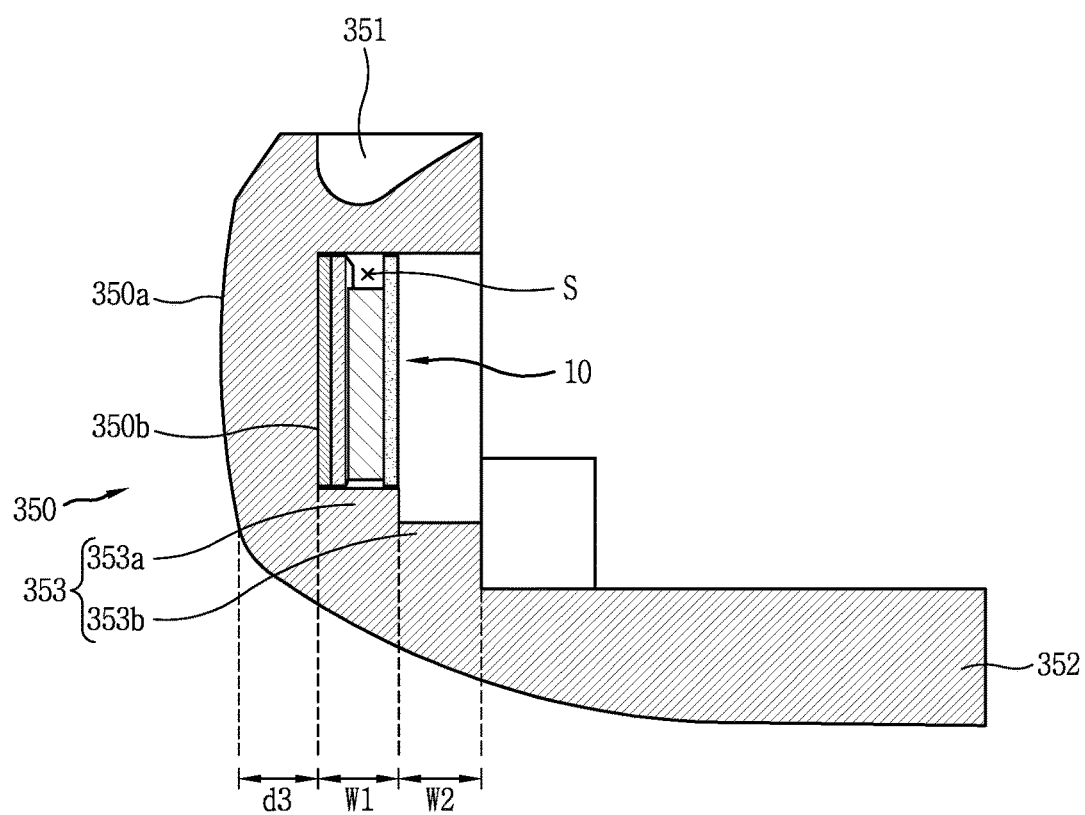

FIGS. 4A and 4B are conceptual views for explaining a structure of a fifth case.

FIG. 4A is a perspective view showing a cut-out region of the fifth case 350, and FIG. 4B is a sectional view of the fifth case where the grip sensor is mounted. The fifth case 350 includes a guide groove 351 for supporting the edge of the display unit 151.

The fifth case 350 includes a rear region 352 not coupled to the rear cover and forming a rear surface of the body of the electronic device 100. Further, the fifth case 350 includes a guide groove 351 for mounting the edge of the display unit 151. A mounting space (S) where the grip sensor 10 is arranged is formed between a region of the guide groove 351 and the rear region 352.

The fifth case 350 includes a first transformation portion 353a having a first width (w1) and forming the mounting space (S), and a second transformation portion 353b having a second width (w2) and extended from the first transformation portion 353a. The second transformation portion 353b forms a stepped region with the rear region 352. A thickness (d3) of the fifth case 350 from an outer surface 350a to an inner surface 350b to which the grip sensor 10 is attached may be formed to be smaller than a thickness of the fourth case 340.

As the first and second transformation portions 353a, 353b are formed, the fifth case 350 may maintain its intensity. Further, since a distance between the grip sensor 10 and the outer surface 350a is minimized, an external force may be transferred to the grip sensor 10 more effectively.

Figure 5A:
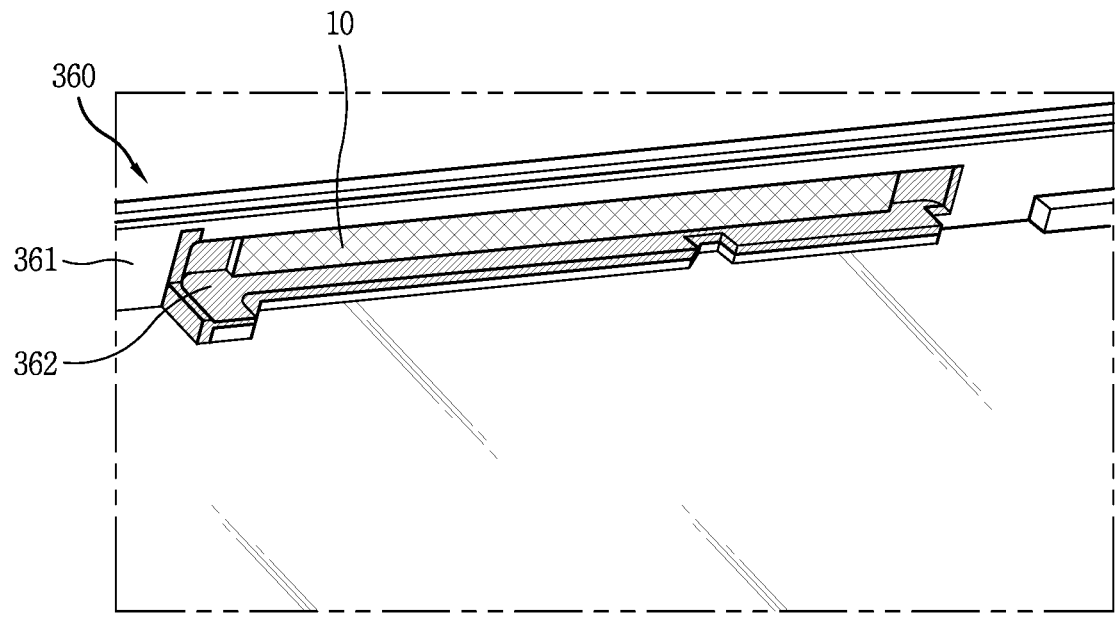
FIGS. 5A and 5B are views for explaining a structure of a sixth case.
Figure 5B:
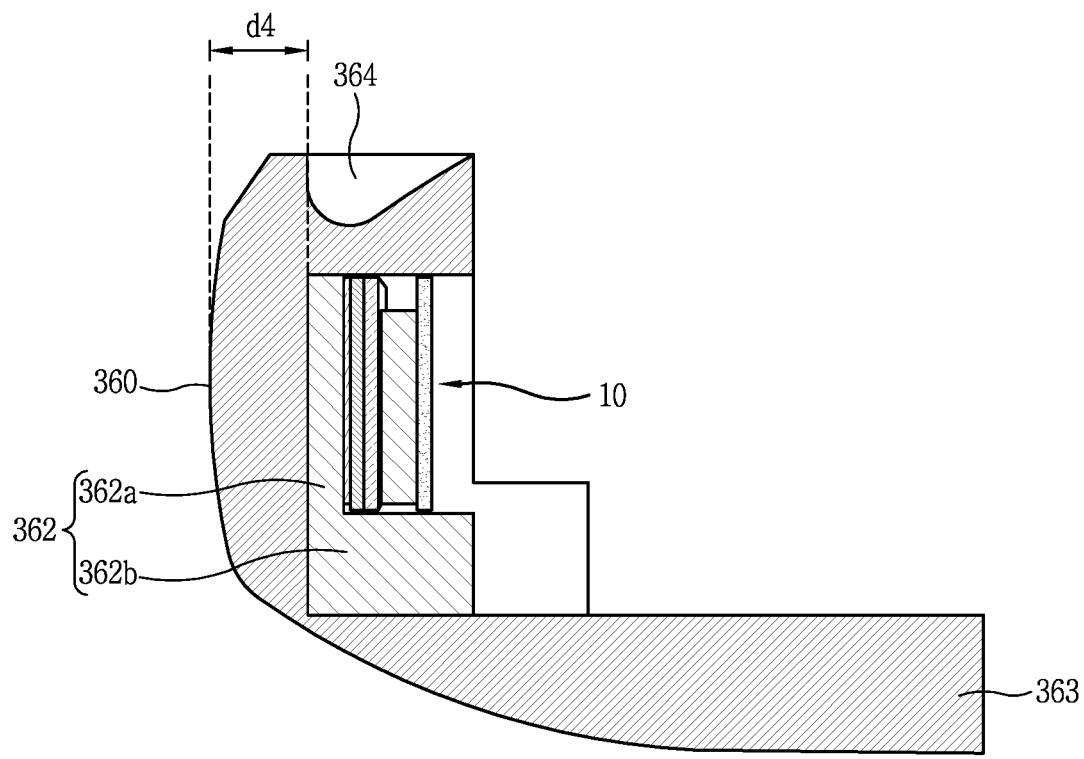

FIGS. 5A and 5B are views for explaining a structure of a sixth case.

Referring to FIGS. 5A and 5B, a guide groove 364 for mounting the edge of the display unit 151 is formed at one region of the sixth case 360. The sixth case 360 includes a rear region 363 which forms the rear surface of the body of the electronic device 100. The sixth case 360 is formed of a metallic material.

The sixth case 360 includes an accommodation space for accommodating the grip sensor 10 therein. A transformation portion 362 where the grip sensor 10 has been mounted is disposed at the accommodation space. The transformation portion 362 is formed of a plastic material (PBT resin). And the transformation portion 362 includes a first region 362a disposed in a direction to increase a thickness of the sixth case 360, and a second region 362b for supporting the grip sensor 10. The grip sensor 10 is attached to the first region 362a of the transformation portion 362.

The sixth case 360 according to this embodiment is formed to have a fourth thickness (d4). The fourth thickness (d4) may be smaller than the first to third thicknesses (d1, d2, d3) of the cases according to other embodiments. Since side surfaces formed by the sixth case 360 and the transformation portion 362 can be easily moved and transformed, an external force can be sensed in a more micro manner. The transformation portion 362 is assembled and/or attached to the sixth case 360.

Figure 6A:
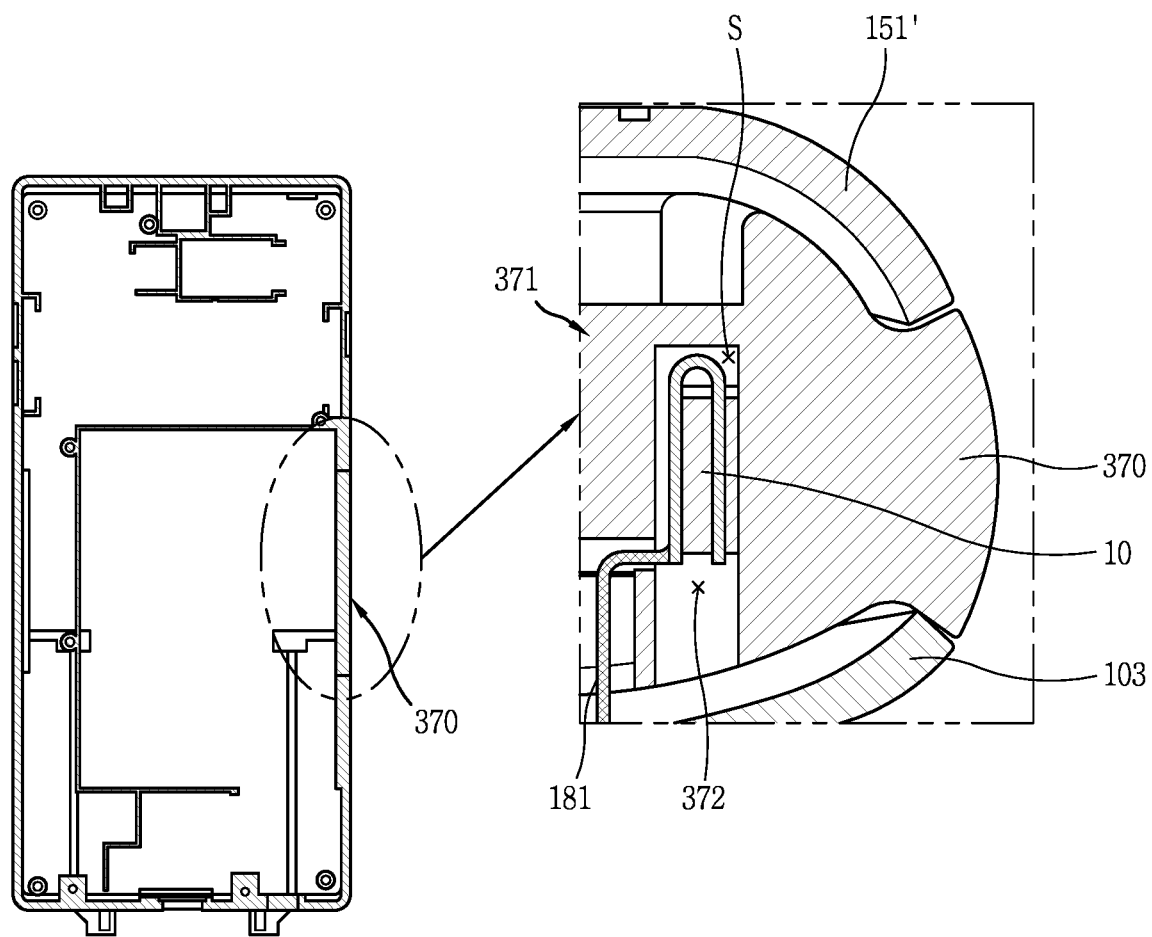
FIGS. 6A to 6C are views for explaining a structure of a seventh case.
Figure 6B:
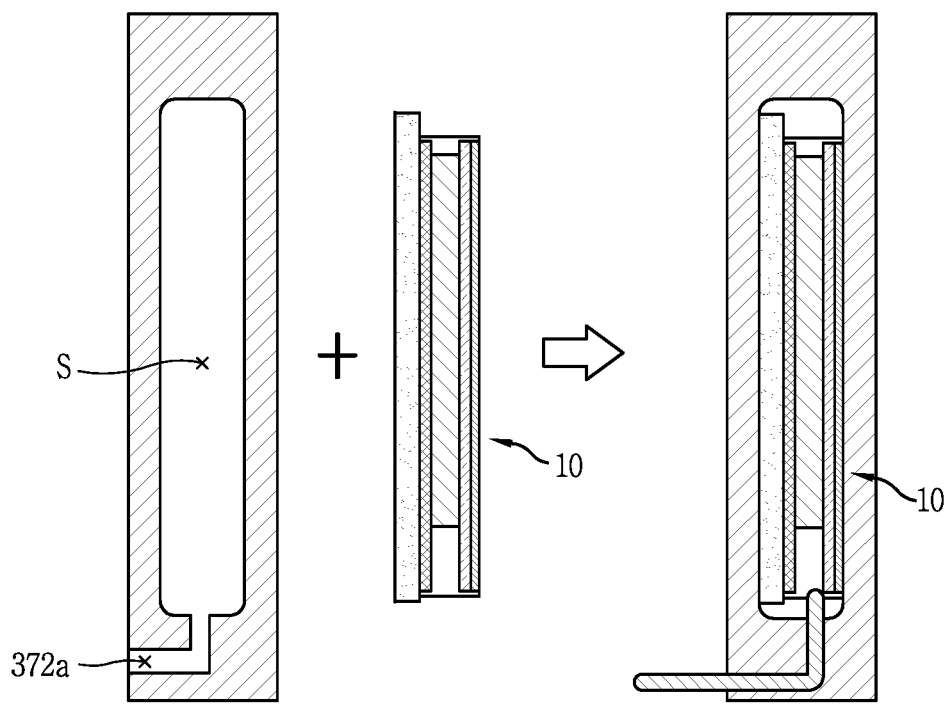
Figure 6C:
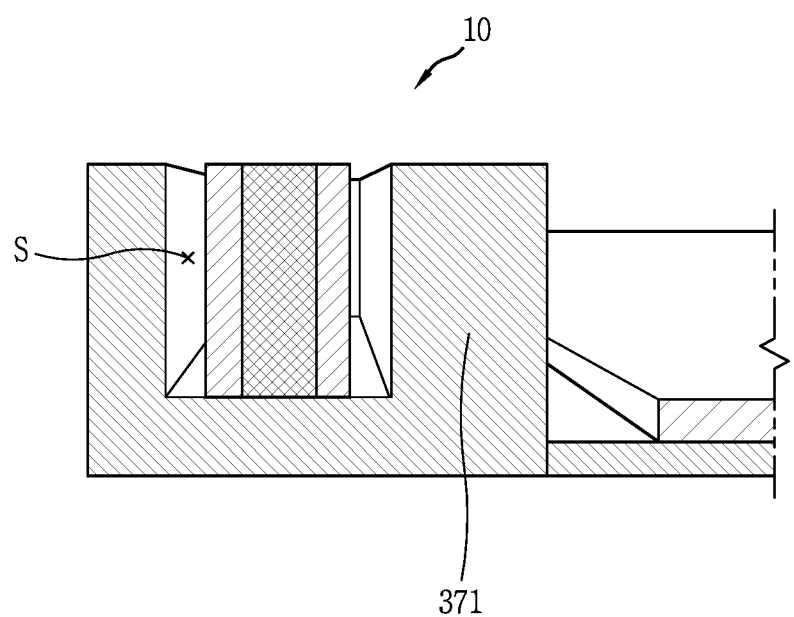

FIGS. 6A to 6C are views for explaining a structure of a seventh case.

Referring to FIG. 6A, the seventh case 370 forms a side surface of the electronic device 100. The seventh case 370 has the window 151' which forms a front surface, and the rear cover 103 which forms a rear surface. The window 151' and the rear cover 103 are disposed at both sides of the seventh case 370.

The seventh case 370 includes a mounting space (S) recessed from an opening 372 formed at one region of the seventh case 370. The opening 372 is formed at a region which faces the rear cover 103. The grip sensor 10 is disposed at the accommodation space.

FIG. 6B is a view showing one region of the seventh case 370 where the opening 372 has been formed. The opening 372 is formed to correspond to a region of the grip sensor 10. The mounting space (S) is not formed at another region of the seventh case 370 where the grip sensor 10 is not arranged. The seventh case 370 includes a connection hole 372a extended from the mounting space (S) and connected to the outside. A flexible printed circuit board 181, which is electrically connected to a main circuit board of the electronic device 100 by being extended from the grip sensor 10, is disposed at the connection hole 372a.

The grip sensor 10 is attached to an inner surface of the seventh case 370 which forms the mounting space (S).

In this embodiment, the seventh case 370 is formed such that its one region where the grip sensor is formed has a small thickness, and such that its remaining regions have a large thickness. Since the region where the grip sensor is formed has a relatively small thickness, the seventh case 370 can be easily transformed and moved. This may allow an external force to be transferred to the grip sensor 10 more effectively. Further, since the remaining regions of the seventh case 370 have a relatively large thickness, lowering of durability may be prevented.

Figure 7A:
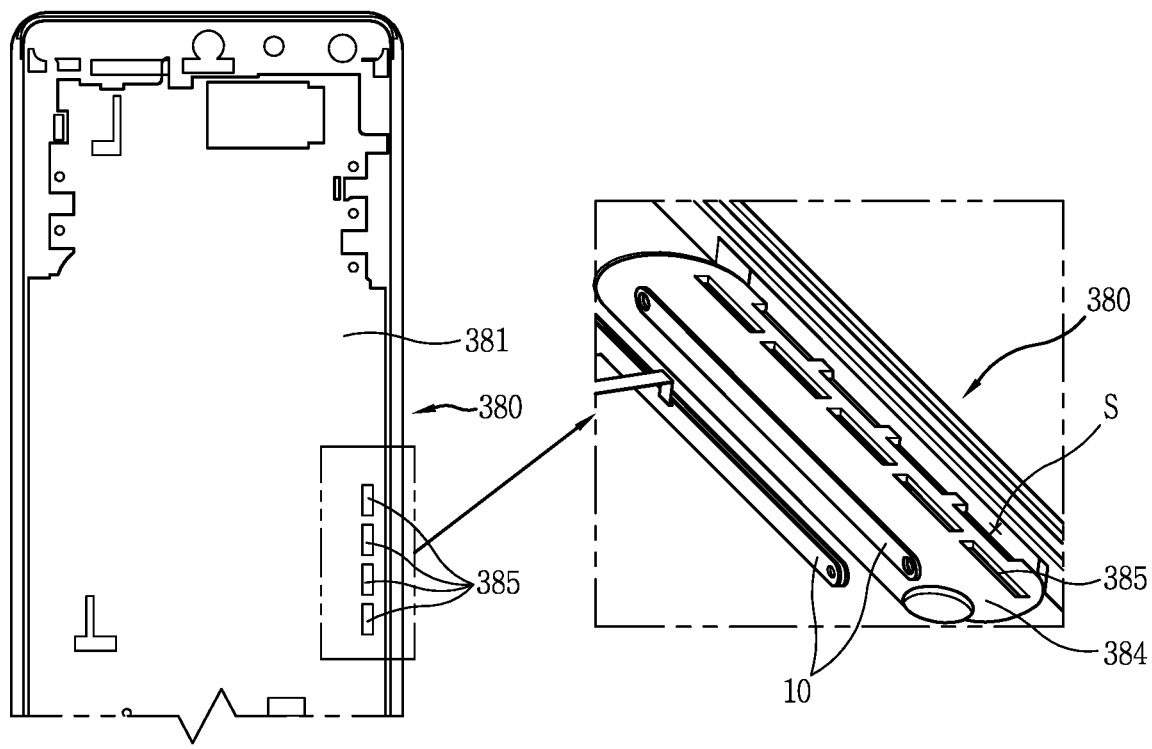
FIGS. 7A to 7C are views for explaining a structure of an eighth case.
Figure 7B:
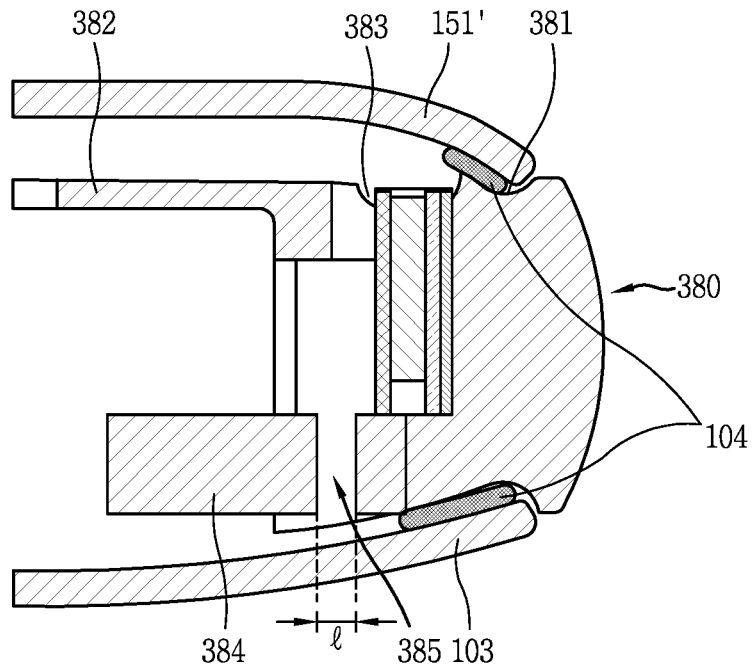
Figure 7C:
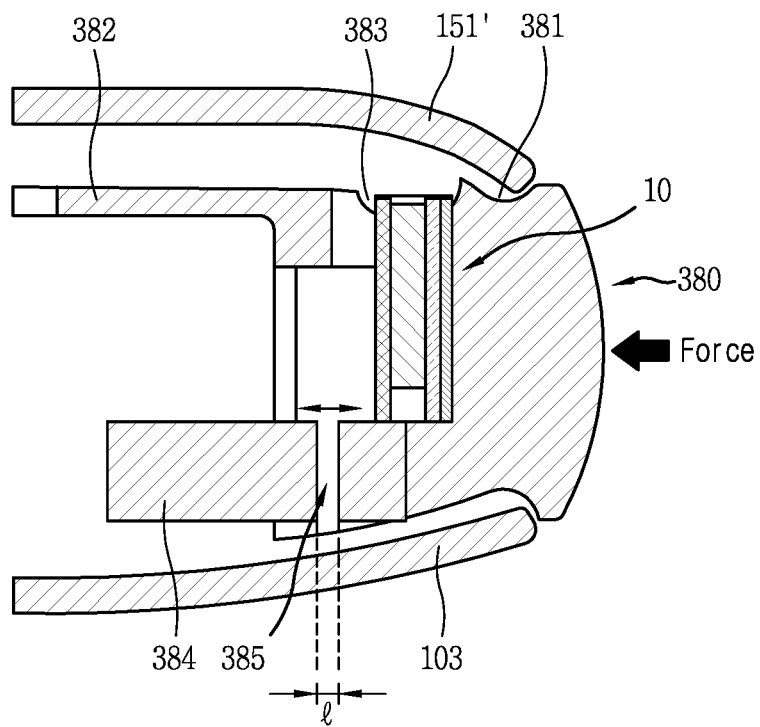

FIGS. 7A to 7C are views for explaining a structure of an eighth case.

The eighth case 380 is formed of a metallic material. The body of the electronic device 100 includes a guide groove 381 for supporting the edge of the display unit 151. The display unit 151 and the rear cover 103 are attached to different surfaces of the eighth case 380 by a waterproof adhesive member 104. That is, the waterproof adhesive member 104 prevents water from being introduced to a space formed by the eighth case 380, the display unit 151 and the rear cover 103. Each of the eighth case 380, the display unit 151 and the rear cover 103 may be fixed by a bonding process rather than by using the waterproof adhesive member 104.

The eighth case 380 includes a first transformation portion 383 adjacent to the guide groove 381 and adjacent to a region where the grip sensor 10 is arranged. The first transformation portion 383 is formed as a groove in order to reduce a thickness of the eighth case 380.

The eighth case 380 may include a supporting frame 382 for supporting at least one electronic component. The supporting frame 382 is integrally formed with a side region which forms side surfaces of the body of the electronic device 100.

The supporting frame 382 includes a second transformation portion 385 formed near the grip sensor 10 and having a specific width (I). The second transformation portion 385 is configured as a hole extended in an extension direction of the grip sensor 10. That is, both surfaces of the supporting frame 382 are communicated with each other by the second transformation portion 385 configured as a hole. The second transformation portion 385 is not overlapped with the grip sensor 10.

The width (I) of the second transformation portion 385 becomes narrow by an external force applied to the side region of the eighth case 380. That is, as an intensity of the eighth case 380 is reduced in a direction that the external force is applied, the external force may be effectively transferred to the grip sensor 10.

Figure 7D:
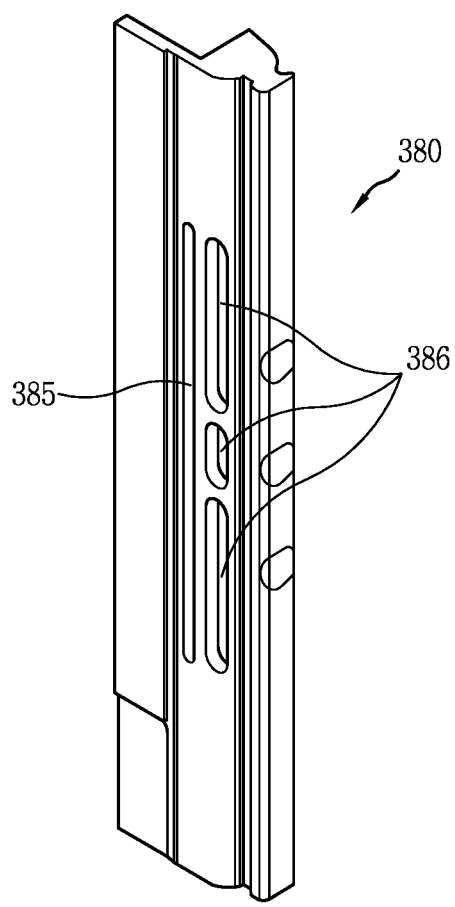
FIG. 7D is a conceptual view showing a transformation portion formed at a supporting frame according to another embodiment.

The second transformation portion 385 according to this embodiment may be formed to correspond to a length of the grip sensor 10. However, a shape of the second transformation portion 385 formed at the supporting frame 382 is not limited to this. FIG. 7D is a conceptual view showing a transformation portion formed at the supporting frame according to another embodiment.

Referring to FIG. 7D, the supporting frame 382 of the eighth case 380 includes second and third transformation portions 385, 386. The third transformation portion 386 includes a plurality of holes arranged in an extension direction of the grip sensor 10. The second and third transformation portions 385, 386 may be arranged to be adjacent to each other.

Figure 8A:
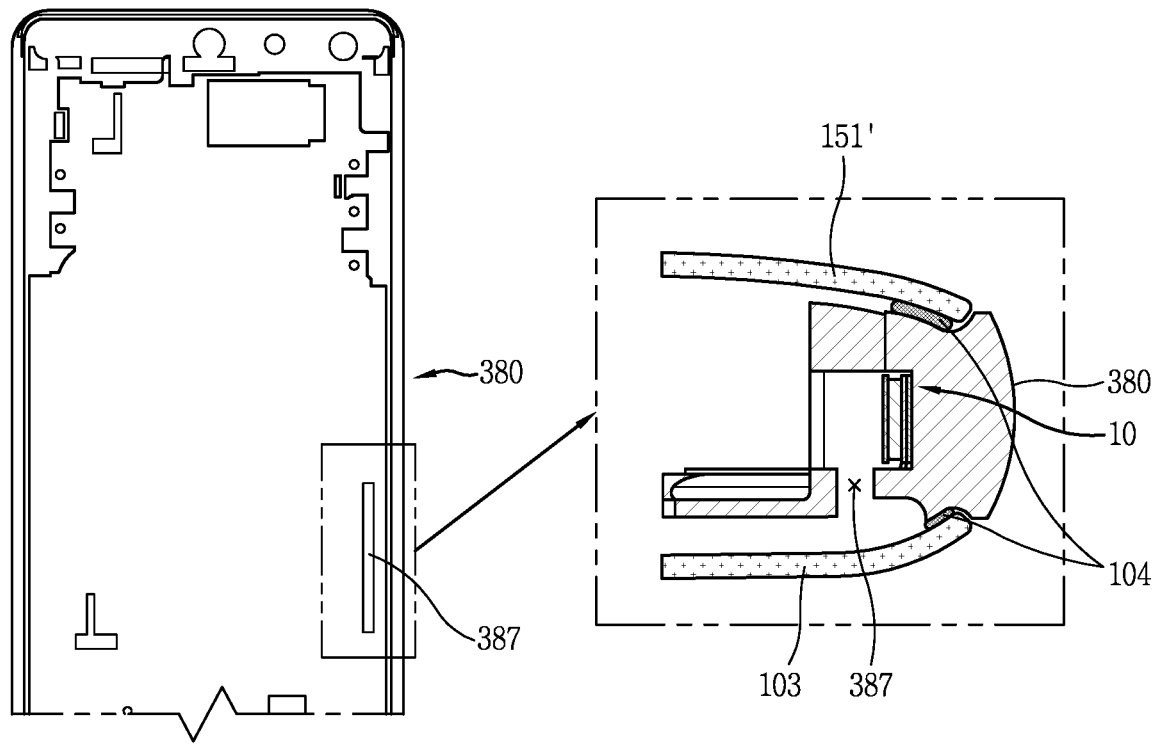
FIGS. 8A and 8B are views for explaining a structure of the eighth case according to another embodiment.
Figure 8B:
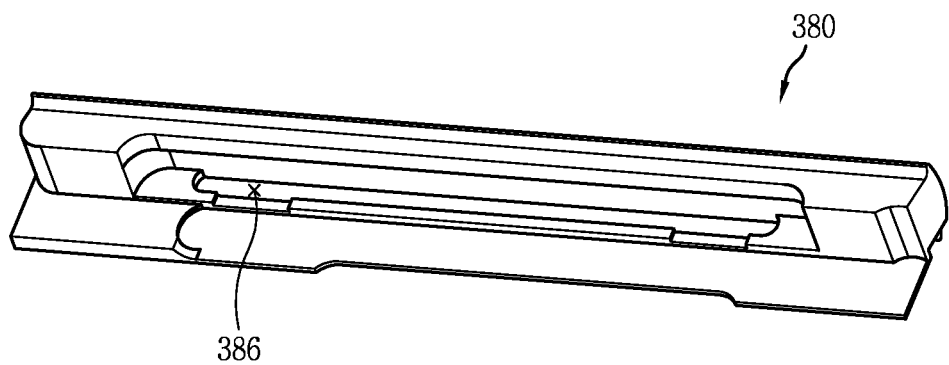

FIGS. 8A and 8B are views for explaining a structure of the eighth case according to another embodiment.

Referring to FIGS. 7A, 8A and 8B, the eighth case 380 according to this embodiment includes the supporting frame 382, and the supporting frame 382 includes a fourth transformation portion 387. The fourth transformation portion 387 is formed near one region of the eighth case 380 where the grip sensor 10 has been attached, and is configured as a hole extended in an extension direction of the grip sensor 10. A length of the fourth transformation portion 387 is formed to correspond to a length of the grip sensor 10.

In this embodiment, a force applied to any region on the side region of the eighth case 380 where the grip sensor 10 is arranged may be uniformly applied to the grip sensor 10.

Figure 9A:
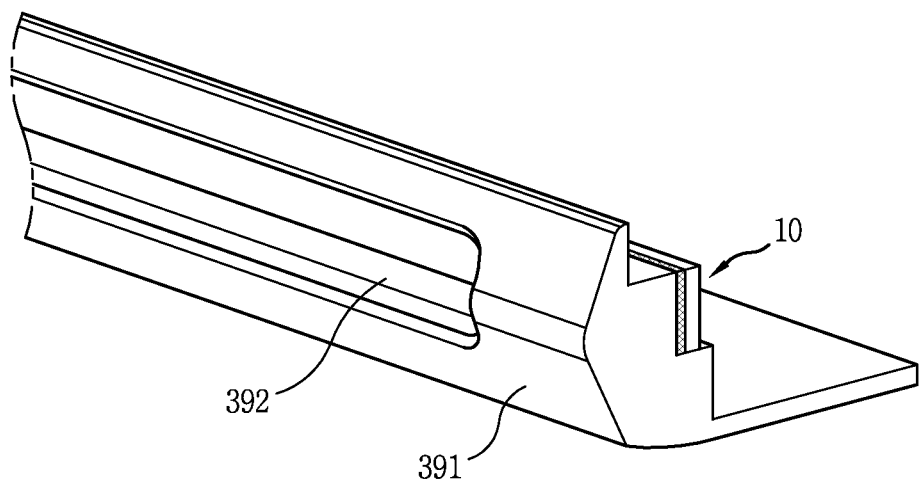
FIGS. 9A and 9B are views for explaining a structure of a ninth case.
Figure 9B:
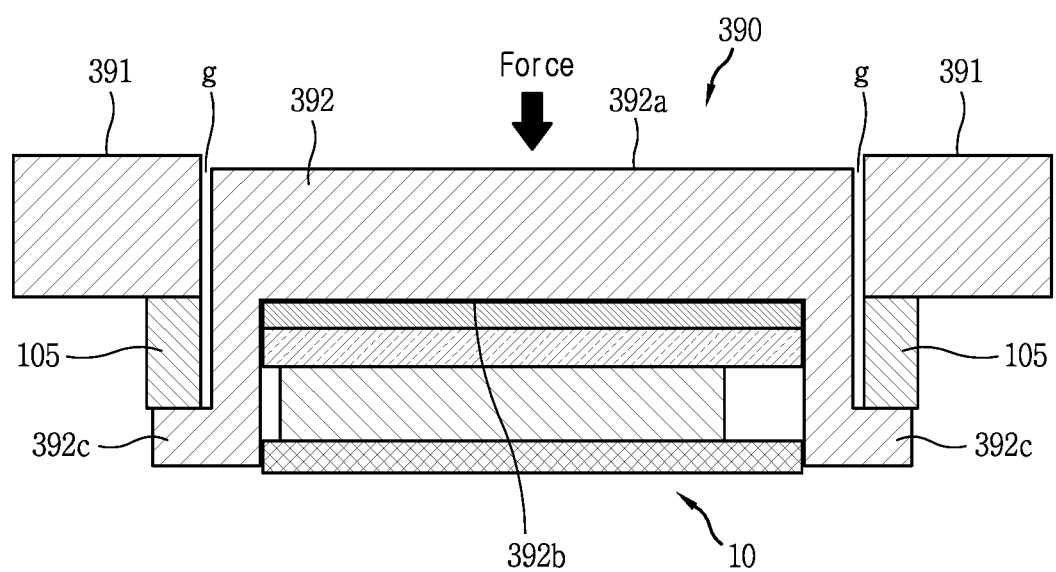

FIG. 9A is a view for explaining a structure of a ninth case.

The ninth case 390 according to this embodiment includes first and second case members 391, 392. The first and second case members 391, 392 are fixed in an attached state to each other, and form an appearance of side surfaces of the electronic device 100. The first case member 391 includes an opening, and one region of the second case member 392 is exposed to the outside through the opening.

The second case member 392 includes an outer surface 392a to which a force is applied, and an inner surface 392b to which the grip sensor 10 is attached. The second case member 392 includes a pair of fixed regions 392c bent from both ends of the second case member 392 and overlapped with one regions of the first case members 391. Adhesive members 105 are formed at the pair of fixed regions 392c to thus be attached to the first case members 391.

A gap (g) is formed between the first and second case members 391, 392. The second case member 392 is transformed and moved in an attached state to the first case member 391. Accordingly, the second case member 392 may be easily transformed and moved by an external force, regardless of a thickness and a shape of the first case member 391 which forms the remaining side surface of the electronic device 100.

Thus, while the ninth case 390 formed of a metallic material maintains its durability, an external force applied to a region where the grip sensor is arranged may be effectively applied to the grip sensor.

In case of arranging the grip sensor in each case formed of a metallic material according to each embodiment, an external force may be effectively transferred to the grip sensor while durability of the side surfaces of the electronic device is maintained.

Figure 10:
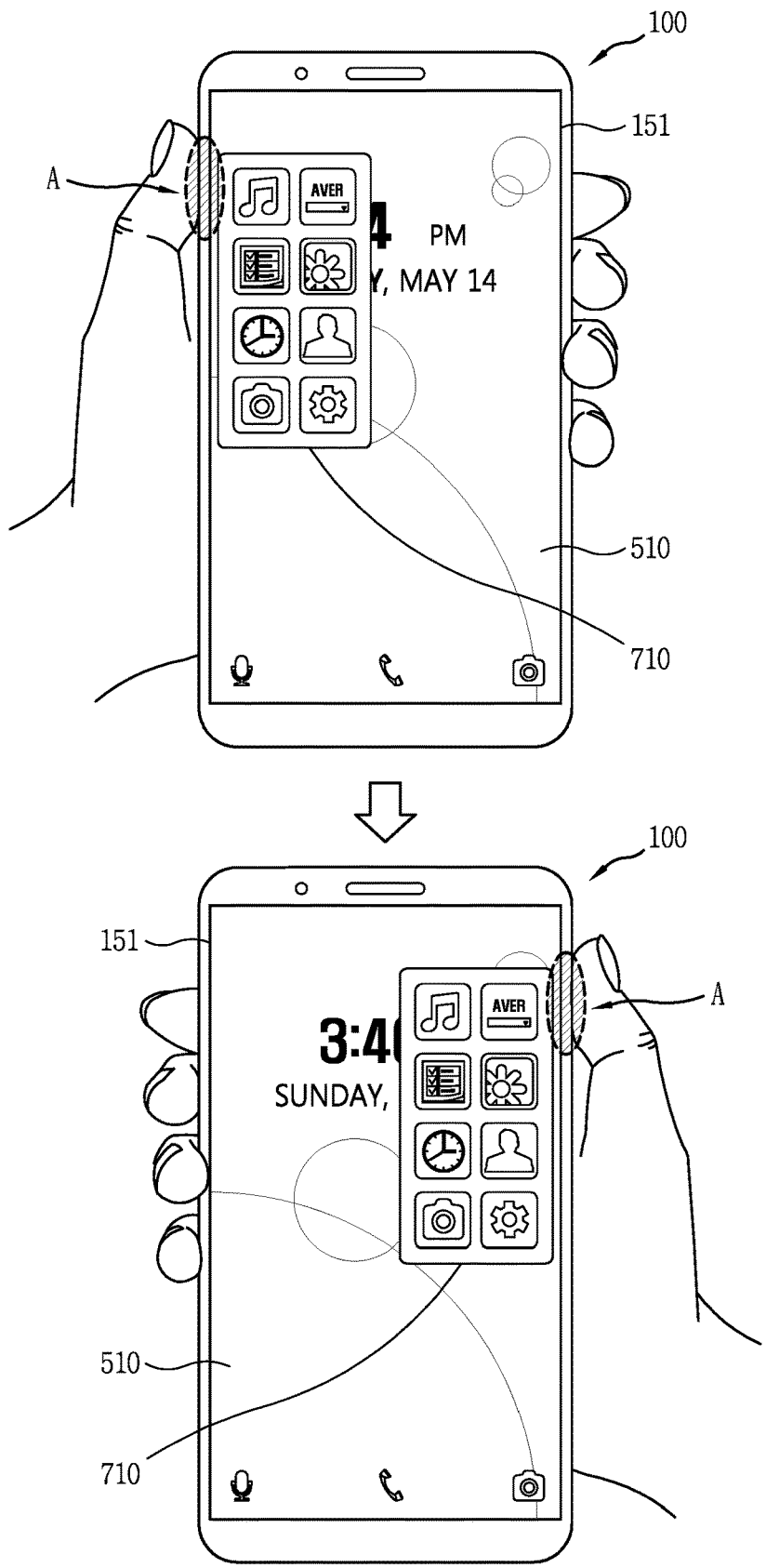
FIG. 10 is a conceptual view for explaining a method for controlling an electronic device using a grip sensor.

FIG. 10 is a conceptual view for explaining a method for controlling the electronic device using the grip sensor.

The electronic device 100 according to this embodiment includes a plurality of grip sensors arranged at a plurality of regions (A) on both side surfaces facing each other. The controller 180 controls the display unit 151 to output specific screen information 710 (a menu screen), by an external force sensed by at least one of the plurality of grip sensors. The specific screen information 710 includes graphic images for receiving a touch input, and the graphic images may correspond to icons for executing applications.

In an output state of a lock screen 510 in a locked state, or in a deactivated state of the display unit, the controller 180 outputs the screen information 710 to one region of the display unit, the one region adjacent to the grip sensor which has sensed an external force.

That is, the controller 180 outputs screen information for receiving a touch input, to one region of the display unit 151, the one region adjacent to a user's finger region. Thus, a user may input a control command without using his or her two hands.

Figure 11A:
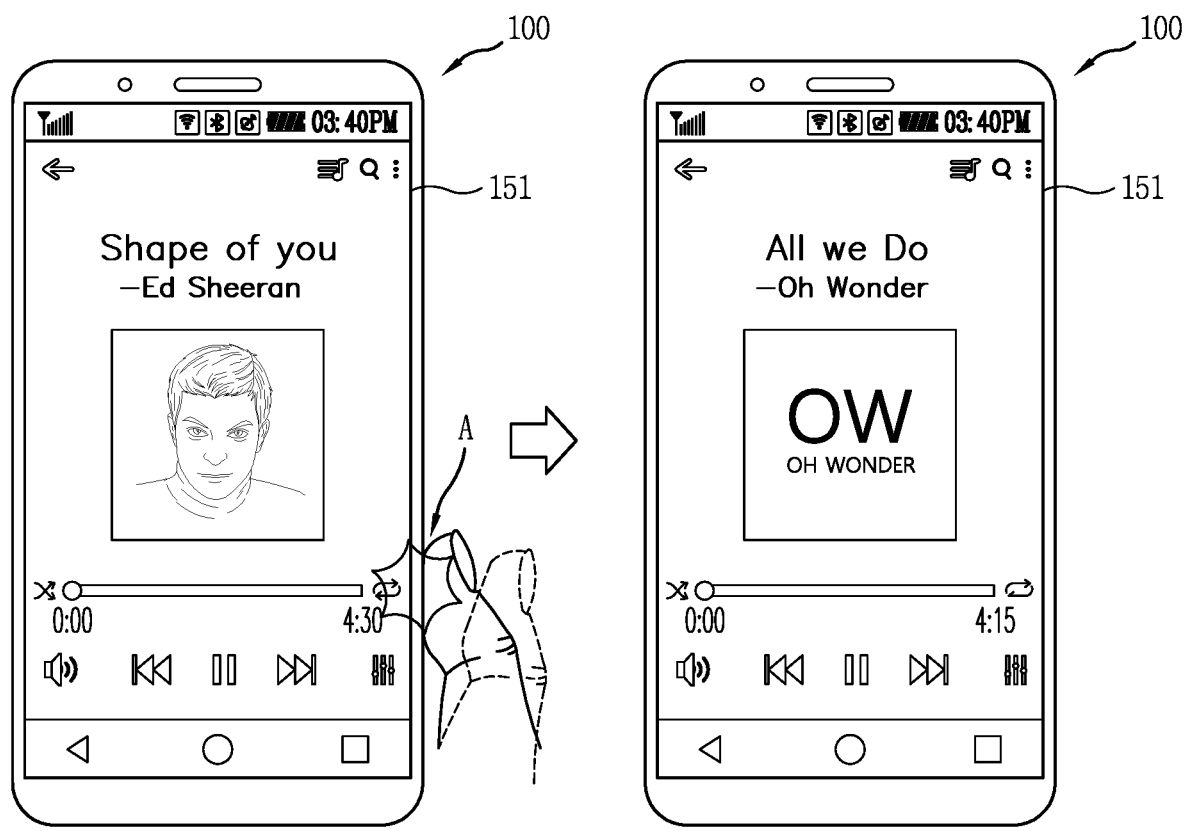
FIGS. 11A to 11C are conceptual view for explaining a control method using a grip sensor.
Figure 11B:
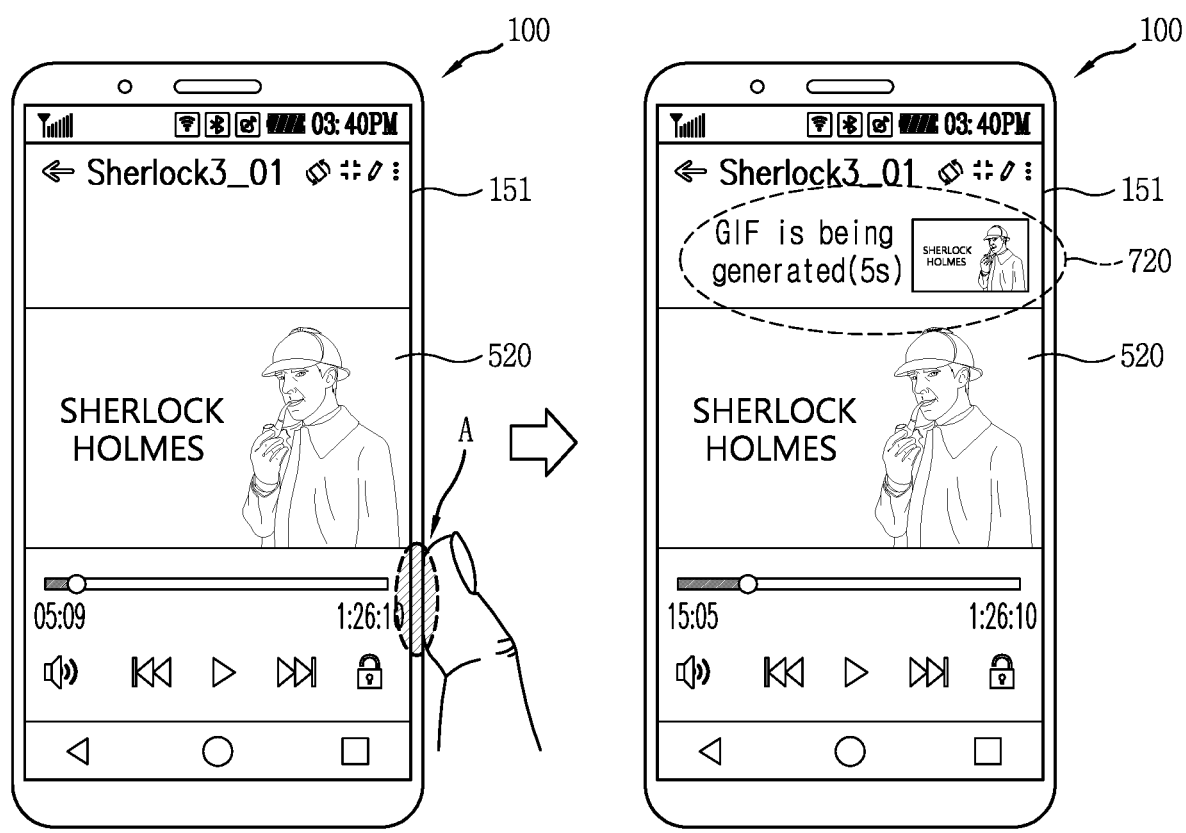
Figure 11C:
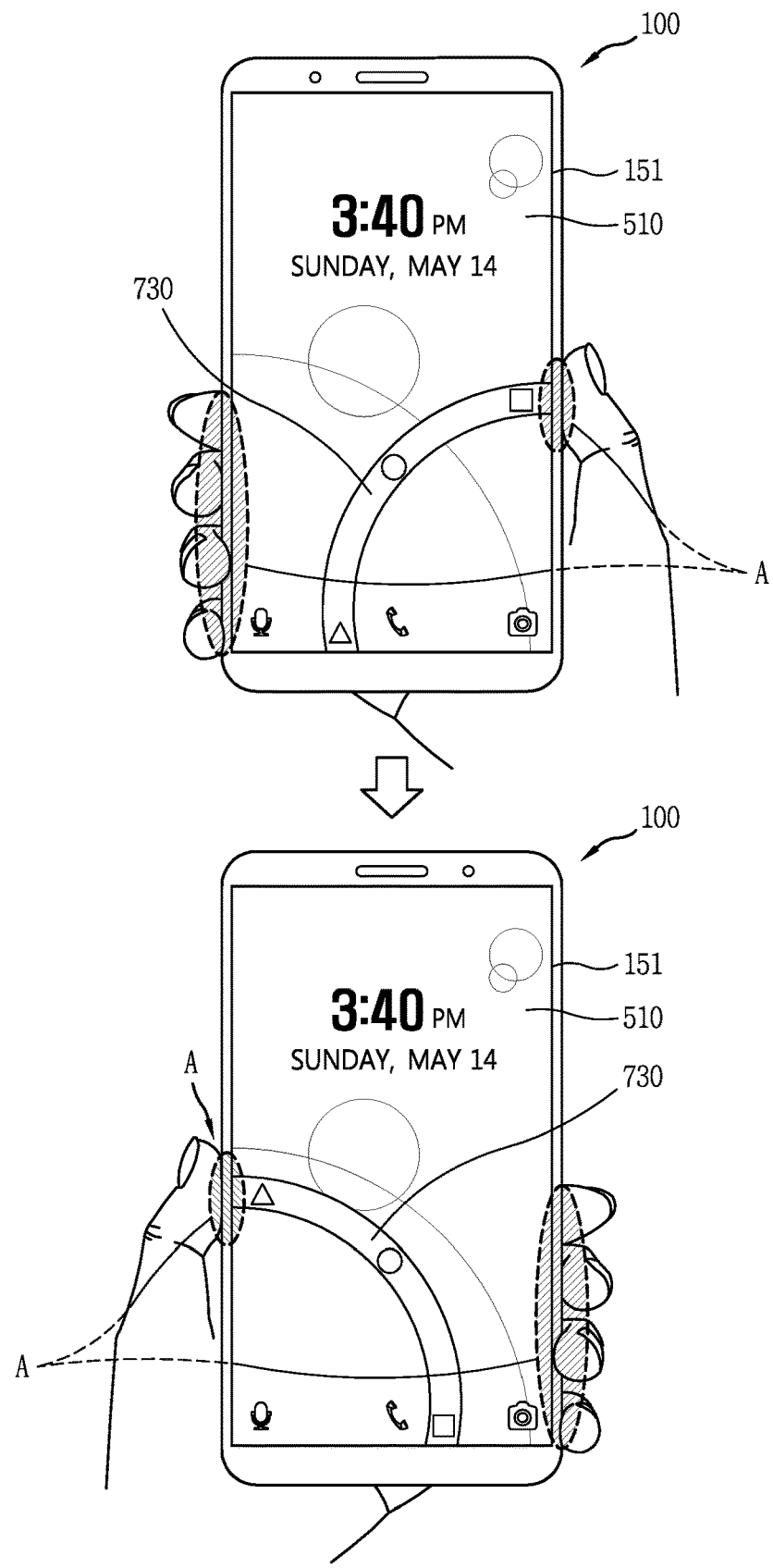

FIGS. 11A to 11C are conceptual view for explaining a control method using the grip sensor.

Referring to FIG. 11A, the grip sensor 10 senses an external force consecutively applied for a specific time (about several seconds). The display unit 151 outputs play screen information related to the sensing while a sound is being output from the audio output unit 152. If a specific type of control command (an operation to tap a plurality of times) is sensed by a grip sensor disposed on a specific region (A), the controller 180 generates a control signal for playing a next song.

Referring to FIG. 11B, the grip sensor 10 senses an external force consecutively applied for a specific time. If the consecutively-applied external force is sensed by the grip sensor while an image 520 is being played, the controller 180 generates one image file (GIF file 720) as a play region while the external force is being applied.

The image file 720 is formed as one region of the image 520 output from a time when the external force has been firstly applied, to a time when the external force has been released.

Thus, a user may generate a control signal which executes a specific function, without blocking an image output to the display unit.

Referring to FIG. 11C, the controller 180 controls the display unit to output a control image 730, to a specific region set based on a pattern of an external force sensed by a plurality of grip sensors.

Each of the plurality of grip sensors disposed at a plurality of regions (A) senses an external force, and the controller 180 determines a posture of a user who is holding the electronic device 10, based on the sensed external forces on the plurality of regions. The controller 180 outputs the control image 730 having a specific size and shape, to a region where the user can conveniently apply a touch input.

For instance, the controller 180 sets an output region near a region where it is expected that the user's thumb will be positioned. A position and a size of the user's hand which holds the electronic device 100 can be calculated based on an external force application position and an external force size. Accordingly, a size and a shape of the control image 730 are set based on the calculated position and size of the user's hand. With such a configuration, the display unit 151 outputs the specific control image 730 to a specific position.

In this embodiment, a user may be provided with a control image for facilitating a touch input, according to a position of a finger.

Figure 12:
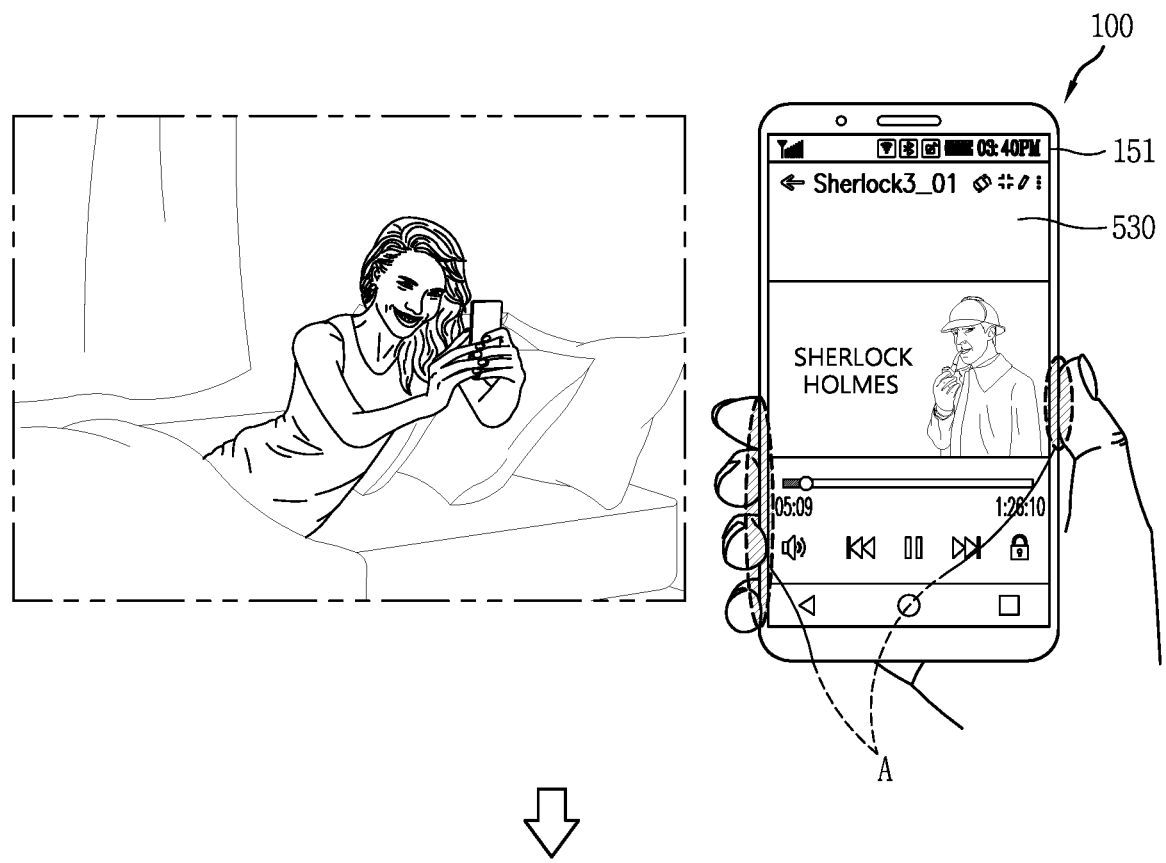
FIG. 12 is a conceptual view for explaining a method for controlling a specific function according to whether an external force has been sensed or not.
Figure 12:
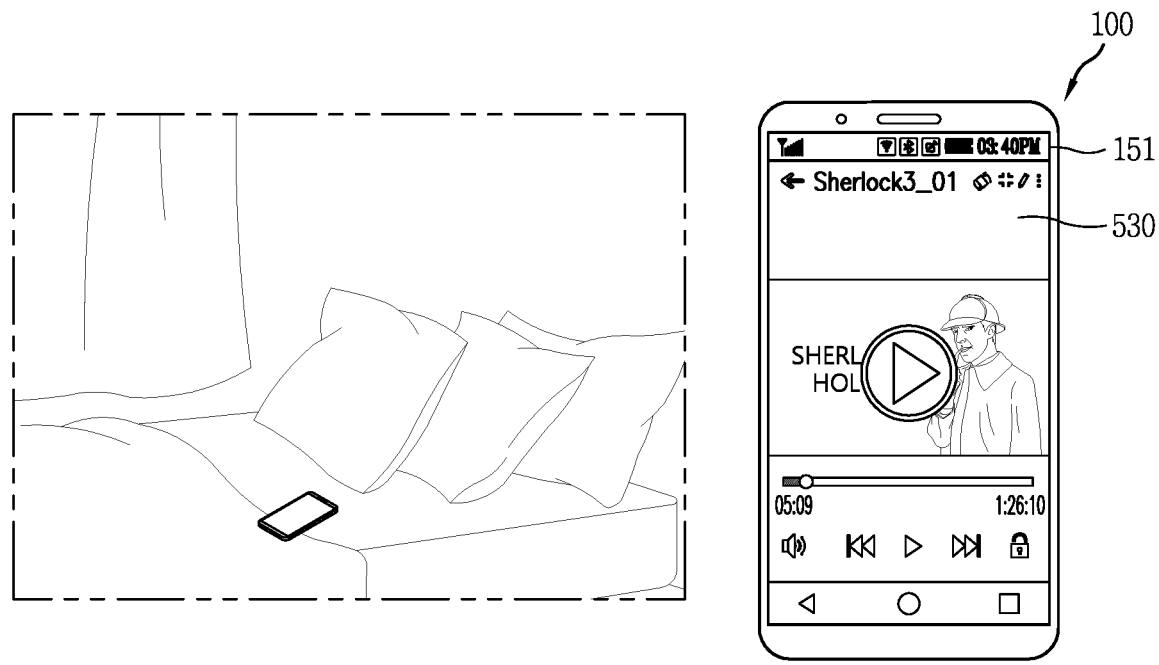

FIG. 12 is a conceptual view for explaining a method for controlling a specific function according to whether an external force has been sensed or not.

The grip sensor 10 senses an external force while an image 530 is being played. The controller 180 continuously outputs the image while the external force is being sensed, but temporarily stops outputting the image if the external force is not sensed by the grip sensor 10.

That is, if a user puts down the electronic device 100 from his or her hand, the image play is temporarily stopped. Although not shown, if a touch input for play is applied in a state that no external force has been sensed, the image is played again.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic device, comprising:
a body including a case, the case being made of a metallic material, and the case defining side surfaces of the body;
a display located at the case, the display defining a front surface of the body;
a grip sensor attached to at least one region of the case, the grip sensor configured to sense a pressure applied to at least one of the side surfaces; and
a controller configured to execute a specific function of the electronic device based on the pressure sensed by the grip sensor,
wherein the case includes a mounting space for accommodating the grip sensor therein,
wherein the case includes a transformation portion located in a thickness direction of the case near the grip sensor,
wherein the grip sensor includes:
a substrate having a first surface and a second surface;
a first transformation member located at the first surface; and
a second transformation member located at the second surface, and
wherein the first transformation member is configured to be compressed and the second transformation member is configured to be expanded when force is applied to the at least one side surface.

2. The electronic device of claim 1, wherein the case includes:
an outer surface defining an exterior surface of the body; and
an inner surface, the grip sensor being located at the inner surface, and
wherein the transformation portion is located between the outer surface and the inner surface of the case.

3. The electronic device of claim 2, wherein the transformation portion is a groove in a surface connecting the outer surface and the inner surface of the case to each other.

4. The electronic device of claim 2, wherein the transformation portion is made of a metal material.

5. The electronic device of claim 2, wherein the case includes a recess region formed at the inner surface of the case, and
wherein the grip sensor is mounted to the recess region.

6. The electronic device of claim 1, wherein the mounting space is located between the outer surface of the case and the inner surface of the case.

7. The electronic device of claim 1, wherein the case further includes a supporting frame disposed in the body and configured to support at least one electronic device, and
wherein the transformation portion is a hole located at one region of the supporting frame adjacent to the grip sensor.

8. The electronic device of claim 7, further comprising a rear cover located at the case, the rear cover defining a rear surface of the body,
wherein the display is attached to the case by a first waterproof adhesive member, and
wherein the rear cover is attached to the case by a second waterproof adhesive member.

9. The electronic device of claim 1, wherein the case includes an extended portion configured to support the display, and
wherein the transformation portion is a hole located at the extended portion.

10. The electronic device of claim 1, wherein the display includes a display window, and
wherein the case includes a guide groove to receive an edge of the display window.

11. An electronic device, comprising:
a body including a case, the case being made of a metallic material, the case defining side surfaces of the body, the case including a guide groove, and the case including a supporting frame disposed in the body and configured to support at least one electronic device;
a display located at the case, the display defining a front surface of the body, and the display including a display window;
a grip sensor attached to at least one region of the case, the grip sensor configured to sense a pressure applied to at least one of the side surfaces; and a controller configured to execute a specific function of the electronic device based on the pressure sensed by the grip sensor, wherein the case includes a mounting space for accommodating the grip sensor therein, wherein the case includes a transformation portion located in a thickness direction of the case near the grip sensor, wherein and edge of the display is received in the guide groove, wherein the grip sensor includes:
- a substrate having a first surface and a second surface;
- a first transformation member located at the first surface; and
- a second transformation member located at the second surface, and wherein the first transformation member is configured to be compressed and the second transformation member is configured to be expanded when force is applied to the at least one side surface.

12. The electronic device of claim 11, further comprising a rear cover located at the case, the rear cover defining a rear surface of the body, wherein the display is attached to the case by a first waterproof adhesive member, wherein the rear cover is attached to the case by a second waterproof adhesive member, and wherein the transformation portion is a hole located at one region of the supporting frame adjacent to the grip sensor.

13. An electronic device, comprising:
a body including a case, the case being made of a metallic material, the case defining side surfaces of the body, the case including a guide groove;

a display located at the case, the display defining a front surface of the body, and the display including a display window;

a grip sensor attached to at least one region of the case, the grip sensor configured to sense a pressure applied to at least one of the side surfaces, the grip sensor including:
- a substrate having a first surface and a second surface;
- a first transformation member located at the first surface; and
- a second transformation member located at the second surface; and a controller configured to execute a specific function of the electronic device based on the pressure sensed by the grip sensor, wherein the case includes a mounting space for accommodating the grip sensor therein, wherein the case includes a transformation portion located in a thickness direction of the case near the grip sensor, wherein and edge of the display is received in the guide groove, and wherein the first transformation member is configured to be compressed and the second transformation member is configured to be expanded when force is applied to the at least one side surface.

* * * * *